US010443289B2

(12) United States Patent
Rrumbullaku et al.

(10) Patent No.: US 10,443,289 B2
(45) Date of Patent: Oct. 15, 2019

(54) VEHICLE WITH POWER SWINGING DOOR AND POSITION-BASED TORQUE COMPENSATION METHOD

(71) Applicant: GM GLOBAL TECHNOLOGY OPERATIONS LLC, Detroit, MI (US)

(72) Inventors: Besi Rrumbullaku, Rochester, MI (US); Constandi J. Shami, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 15/634,758

(22) Filed: Jun. 27, 2017

(65) Prior Publication Data

US 2018/0371822 A1 Dec. 27, 2018

(51) Int. Cl.

| | |
|---|---|
| ***E05B 53/00*** | (2006.01) |
| ***E05F 15/71*** | (2015.01) |
| ***E05F 15/75*** | (2015.01) |
| ***H02H 7/085*** | (2006.01) |
| *E05F 15/611* | (2015.01) |
| *E05F 15/40* | (2015.01) |

(52) U.S. Cl.

CPC .............. *E05F 15/71* (2015.01); *E05F 15/75* (2015.01); *H02H 7/0851* (2013.01); *E05F 15/40* (2015.01); *E05F 15/611* (2015.01); *E05Y 2400/326* (2013.01); *E05Y 2400/36* (2013.01); *E05Y 2400/44* (2013.01); *E05Y 2900/50* (2013.01); *E05Y 2900/531* (2013.01)

(58) Field of Classification Search

CPC . E05F 15/71; E05F 15/75; E05F 15/40; E05F 15/611; H02H 7/0851; E05Y 2900/50; E05Y 2400/44; E05Y 2400/36; E05Y 2400/326; E05Y 2900/531

USPC .............................................................. 49/21

See application file for complete search history.

(56) References Cited

U.S. PATENT DOCUMENTS

| | | | | |
|---|---|---|---|---|
| 5,588,258 A * | 12/1996 | Wright | E05F 15/627 | 49/340 |
| 6,550,839 B2 * | 4/2003 | Rogers, Jr. | B60J 5/105 | 296/146.8 |
| 7,686,378 B2 | 3/2010 | Gisler et al. | | |
| 7,690,156 B2 * | 4/2010 | Imai | E05F 15/40 | 296/155 |
| 2004/0090083 A1 * | 5/2004 | Greuel | G05B 19/416 | 296/146.4 |
| 2006/0137248 A1 * | 6/2006 | Ichinose | E05F 15/611 | 49/340 |

(Continued)

*Primary Examiner* — Basil S Katcheves

(74) *Attorney, Agent, or Firm* — Quinn IP Law

(57) ABSTRACT

A system controls opening/closing of a power swinging door, e.g., in a vehicle, and includes a rotary actuator, position sensor, and controller. In a controller-executed method, the actuator applies torque to the door in response to control signals. The controller uses a measured raw angular position from the sensor to determine wind- or grade-based external forces acting on the door during opening or closing, and adjusts the actuator torque in response to the external forces. The sensor may be a rotary encoder, with the actuator being an electric motor. Lookup tables contain data relating oscillation to the external forces. The controller may induce door oscillation and to relate oscillation decay to the external forces. An obstacle-based current threshold may be adjusted in response to the external forces.

18 Claims, 3 Drawing Sheets

(56) References Cited

U.S. PATENT DOCUMENTS

2006/0181108 A1* 8/2006 Cleland .................. E05F 15/43
296/146.4
2007/0266635 A1* 11/2007 Sugiura ................ E05F 15/632
49/27
2008/0150319 A1* 6/2008 Ray ........................ E05F 15/70
296/146.1
2008/0250720 A1* 10/2008 Oxley .................. E05F 15/622
49/358
2008/0296927 A1* 12/2008 Gisler .................... E05F 15/43
296/146.4
2015/0096233 A1* 4/2015 Kojima .................... H02P 3/14
49/31
2016/0237733 A1* 8/2016 Henseleit ................ B60J 5/047
2016/0348413 A1* 12/2016 Broadhead ............. E05F 15/73

* cited by examiner

F
R
OSC
t
A
B
1/0
(20)

VEHICLE WITH POWER SWINGING DOOR AND POSITION-BASED TORQUE COMPENSATION METHOD

INTRODUCTION

Motor vehicles include swinging side doors that enable occupants to enter and exit the vehicle's interior. With doors of this type, an occupant pulls on an exterior door handle to actuate a lever mechanism located within the door. Once unlatched, the door pivots on a hinge anywhere between and inclusive of a fully-closed and a fully-open position. Swinging side doors house power window and folding mirror control components, door lock mechanisms, support structure, and latching mechanisms. Each of the housed components contributes additional mass to the door. Therefore, in order to facilitate opening and closing of a swinging side door, the doors may be equipped with a rotary actuator such as an electric door motor that powers the opening and closing functions.

SUMMARY

A system is disclosed herein for controlling the opening and closing functions of a power swinging door of the type noted above, e.g., a swinging side door, rear tailgate, or other hinged door that at times might be subjected to wind-based and grade-based forces. A possible embodiment of the system includes a rotary actuator, a position sensor, and a programmable controller. The rotary actuator may have a corresponding obstacle-based electrical current threshold, i.e., a programmed motor current threshold that is used to stop motion of the door in the event the door encounters an obstacle or other static load. The actuator, such as an electric door motor, applies an output torque to the door in response to receipt of actuator control signals from the controller. The position sensor measures a raw angular position of the door and reports the measured raw angular position to the controller as a set of raw angular position signals.

The controller, which is in communication with the rotary actuator and the position sensor, determines wind forces and gravitational forces (collectively referred to as "external forces") acting on the door during an opening or closing operation of the door, doing so using the raw angular position signals from the sensor. That is, oscillation patterns present in the raw angular position signals may be associated in memory of the controller with wind-based and/or grade-based external forces that the rotary actuator ultimately accounts for when opening or closing the door. To account for the external forces, the controller may automatically adjust the actuator control signals to increase or decrease the output torque from the rotary actuator. The controller may temporarily increase or decrease the current threshold governing control of the actuator as part of the disclosed control approach whenever conditions are indicative of an absence of a static obstacle in a swing path of the door.

In various alternative embodiments, the controller is programmed with lookup tables containing data relating oscillation of the raw angular position signals to the external wind-based or gravity-based forces acting on the door, and/or to induce oscillation of the door via the actuator control signals and thereafter relate a resultant oscillation decay of the raw angular position signals to the external forces acting on the door.

The controller may optionally brake or arrest motion of the door via the rotary actuator via adjustment of a flow of electrical current to the rotary actuator. Such a control action may occur, for instance, in response to motion of the door in a direction that is the same as a direction of the external forces acting on the door.

In an optional embodiment, the door is a swinging side door of a motor vehicle, with the controller in such an embodiment configured as a vehicle control module.

A method is also disclosed herein for controlling opening and closing of a power swinging door. In an example embodiment, the method includes measuring a raw angular position of the door via a position sensor, and determining, via the controller, the magnitude of wind-based or grade-based external forces acting on the door using raw angular position signals from the sensor, particularly when the door is in the process of opening or closing. The method also includes selectively increasing or decreasing the output torque from the rotary actuator via transmission of actuator control signals from the controller to the rotary actuator in response to the external forces to thereby compensate for the external forces.

The above-noted and other features and advantages of the present disclosure are readily apparent from the following detailed description of the best modes for carrying out the disclosure when taken in connection with the accompanying drawings.

Figure 1:
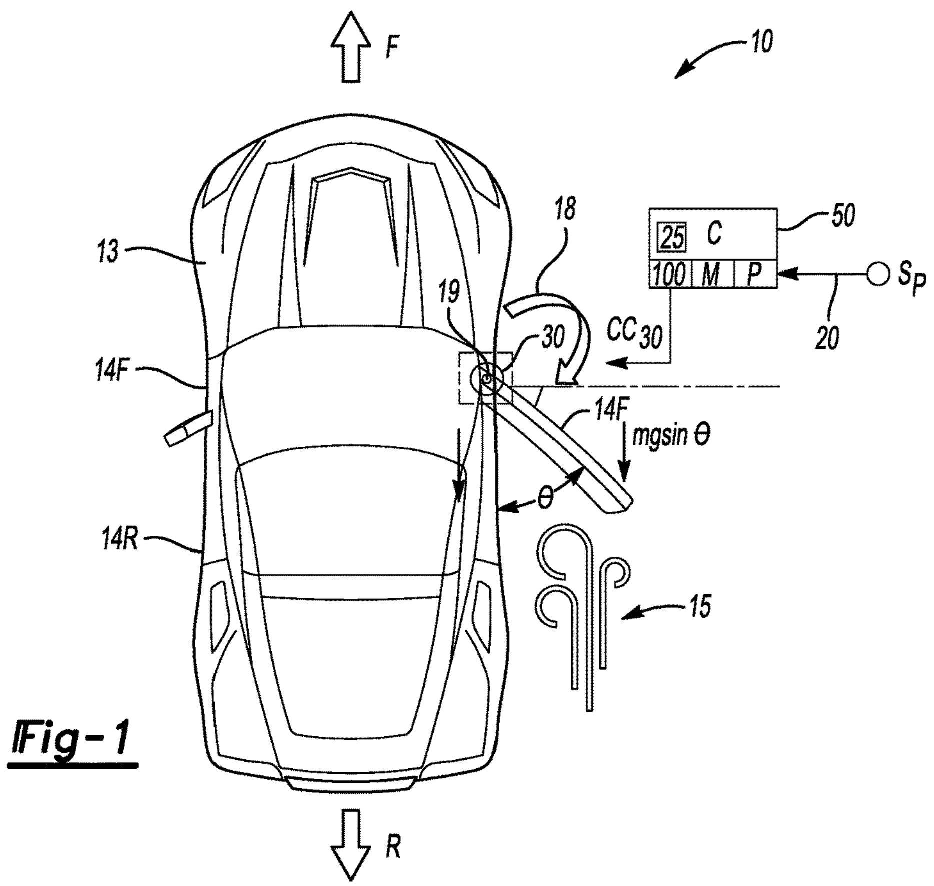
FIG. 1 is a schematic plan view illustration of an example vehicle having power swinging doors and a controller configured to control operation of the doors based on a wind and/or grade influence on the door's motion.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the drawings. Rather, the disclosure is to cover all modifications, equivalents, permutations, combinations, sub-combinations, and alternatives falling within the spirit and scope of the disclosure as defined by the appended claims.

DETAILED DESCRIPTION

Referring to the drawings, wherein like reference numbers refer to like components throughout the several views, a schematic motor vehicle 10 has respective front (arrow F) and rear (arrow R) driving directions. The vehicle 10 includes a vehicle body 13, power swinging front side doors 14F that open and close with respect to the body 13, and, optionally, a substantially similar pair of power swinging rear side doors 14R. The front and rear side doors 14F and 14R are configured to swing or pivot about a door hinge 19 as indicated by arrow 18 to a desired angular position (θ), such as between about 0 and 90 degrees of a longitudinal axis of the vehicle 10.

Opening/closing motion of the side doors 14F and 14R occurs in response to an applied door force. As configured herein, such an applied door force is applied to the door 14F or 14R in whole or in part by a rotary actuator 30, such as an electric door motor, that is operatively connected to a corresponding one of the doors 14F and 14R proximate a respective hinge 19. For simplicity, one door 14F is shown in FIG. 1 as being equipped with the rotary actuator 30, with the described power swinging configuration understood to be present in the remaining front and rear doors 14F and 14R. The front door 14F will be described hereinafter for illustrative consistency without limiting the approach to the described front door 14F.

On especially windy days, increased resistance to normal travel of the door 14F through its swing path may be present due to the force effect of incident wind 15. Likewise, the vehicle 10 may be parked on a grade, in which case gravitational forces will tend to urge the door 14F open or closed depending on the direction of the grade. Absent such wind 15 and grade, an obstacle (not shown) may be present in the range of motion or swing path of the front door 14F. Such conditions ultimately affect the load on the rotary actuator 30 in regulating motion of the front door 14F, possibly causing an electrical current to the rotary actuator 30 to increase. The present disclosure is therefore directed toward identifying and quantifying the force effects of wind 15 and grade on the front door 14F when an obstacle is not otherwise detected, and automatically compensating for such force effects in the overall torque control of the rotary actuator 30.

The rotary actuator 30 of FIG. 1 is configured to apply an output torque to the front door 14F to automatically rotate the front door 14F about the hinge 19. This action occurs in response to receipt by the rotary actuator 30 of a set of actuator control signals (arrow $CC_{30}$) from a controller (C) 50, such as a vehicle body control module or other vehicle control module in the example vehicular embodiment of FIG. 1. This process occurs according to a method 100, an example embodiment of which is described below with reference to FIG. 4. Swinging doors like the front doors 14F of FIG. 1 may at times encounter obstacles within the sweep path of the door 14F as the door 14F is opening or closing. As a result, the controller 50 is programmed with a calibrated obstacle-based current threshold 60 (see FIG. 3). The controller 50 is also programmed to selectively adjust the obstacle-based current threshold 60 of FIG. 3 according to the method 100 when the controller 50 dynamically determines that forces acting on the door 14F are not indicative of a static obstacle, but rather are due to external forces from gusts of wind 15 or the vehicle 10 being parked on a grade. Gravitational effects of grade on the door 14F are indicated in FIG. 1 by arrow mg sin θ, where m is the predetermined mass of the door 14F, g is the gravitational constant, and θ is the angular position of the door 14F, as noted above.

The controller 50 of FIG. 1 is in communication with the rotary actuator 30 and a corresponding position sensor $S_P$. The position sensor $S_P$ may be optionally embodied as a motor encoder or resolver, and thus is capable of measuring the dynamically changing raw angular position of the front door 14F with respect to the hinge 19 using rotary transformer pairs, with an example of the raw position signals shown as an optional square wave signal/binary high-low (0/1) output of respective secondary windings labeled A and B in FIG. 3. The position sensor $S_P$ may be integral with the rotary actuator 30 as part of a door motor assembly (not shown), with the position sensor $S_P$ shown separately in FIG. 1 for illustrative clarity. The controller 50 is configured to use the measured raw angular position signals (arrow 20) from the position sensor $S_P$ to calculate the actual angular position θ of the door 14F within the range of motion or sweep of the door 14F and, as explained further below, to detect oscillation in the raw angular position signals (arrow 20) indicative of external forces on the door 14F.

The controller 50 may be embodied as one or more computer devices with memory (M) and a processor (P). The memory (M) may include tangible, non-transitory memory, e.g., read only memory, whether optical, magnetic, flash, or otherwise, with one or more lookup tables 25 programmed in memory (M) for use in the method 100 as explained below. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

Figure 4:
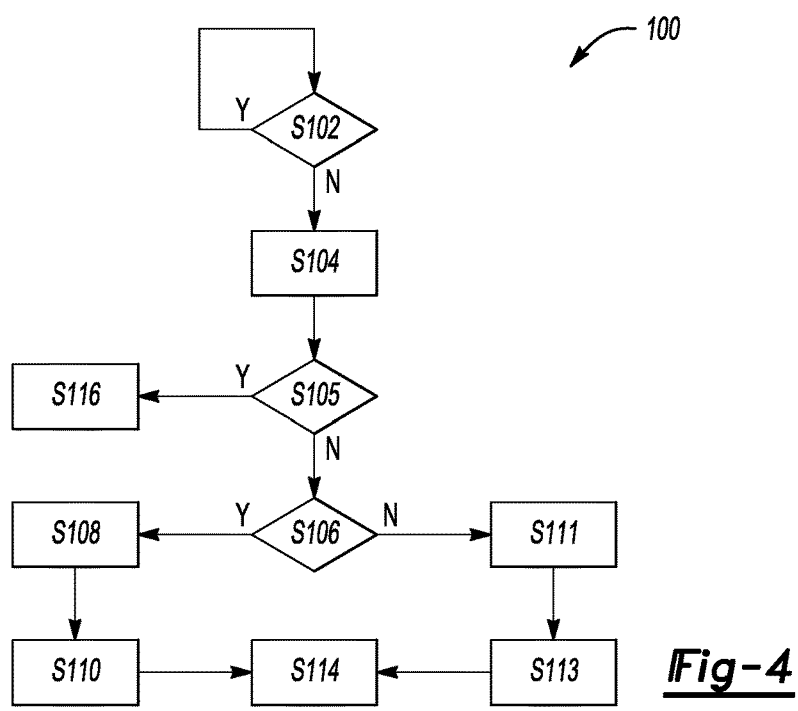
FIG. 4 is a flow chart describing an example method for controlling motion of the doors of FIG. 1 using position-based torque compensation as described herein.
Figure 2:
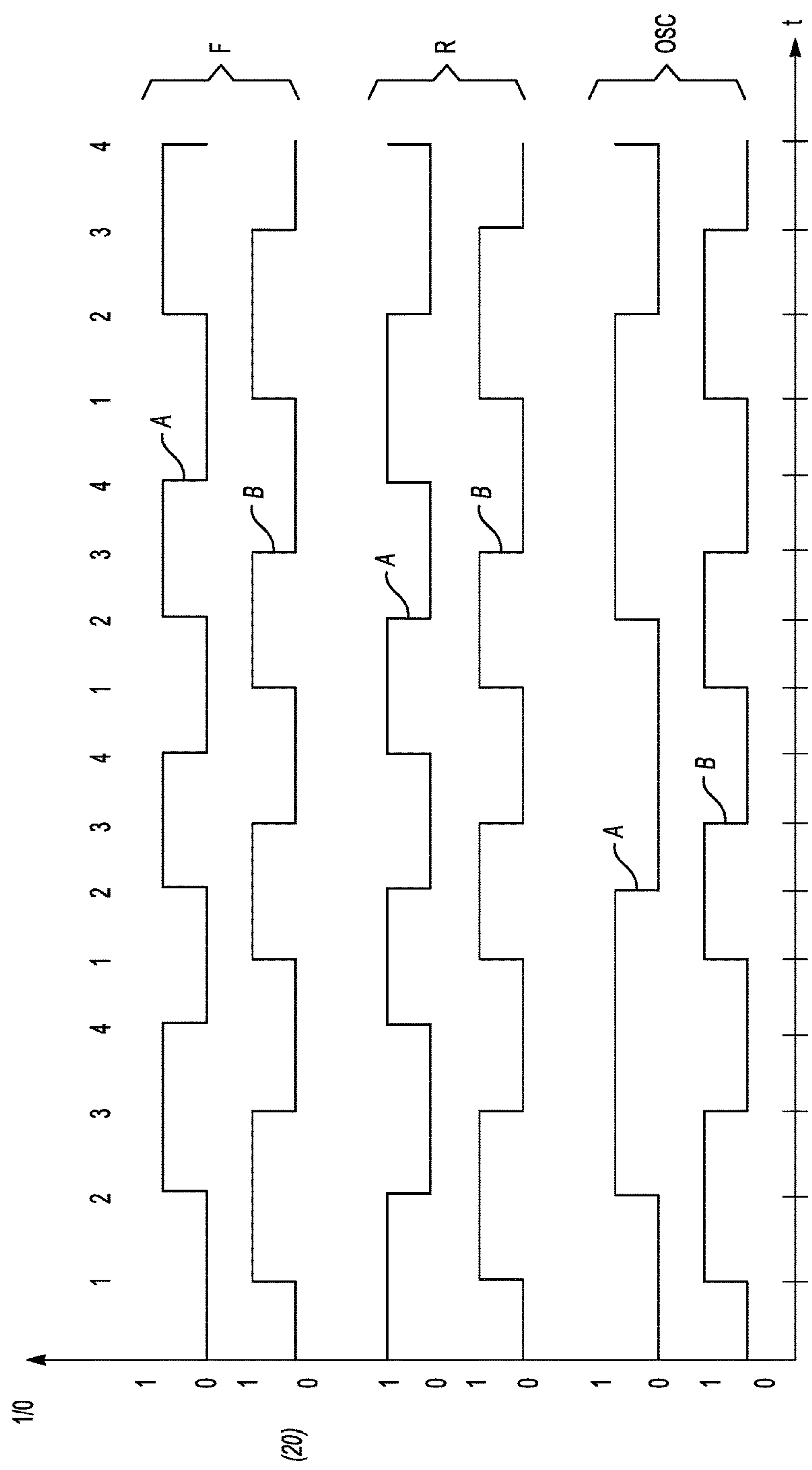
FIG. 2 is a representative time plot encoder raw data in forward, rearward, and oscillating directions of motion of the doors shown in FIG. 1.
Figure 3:
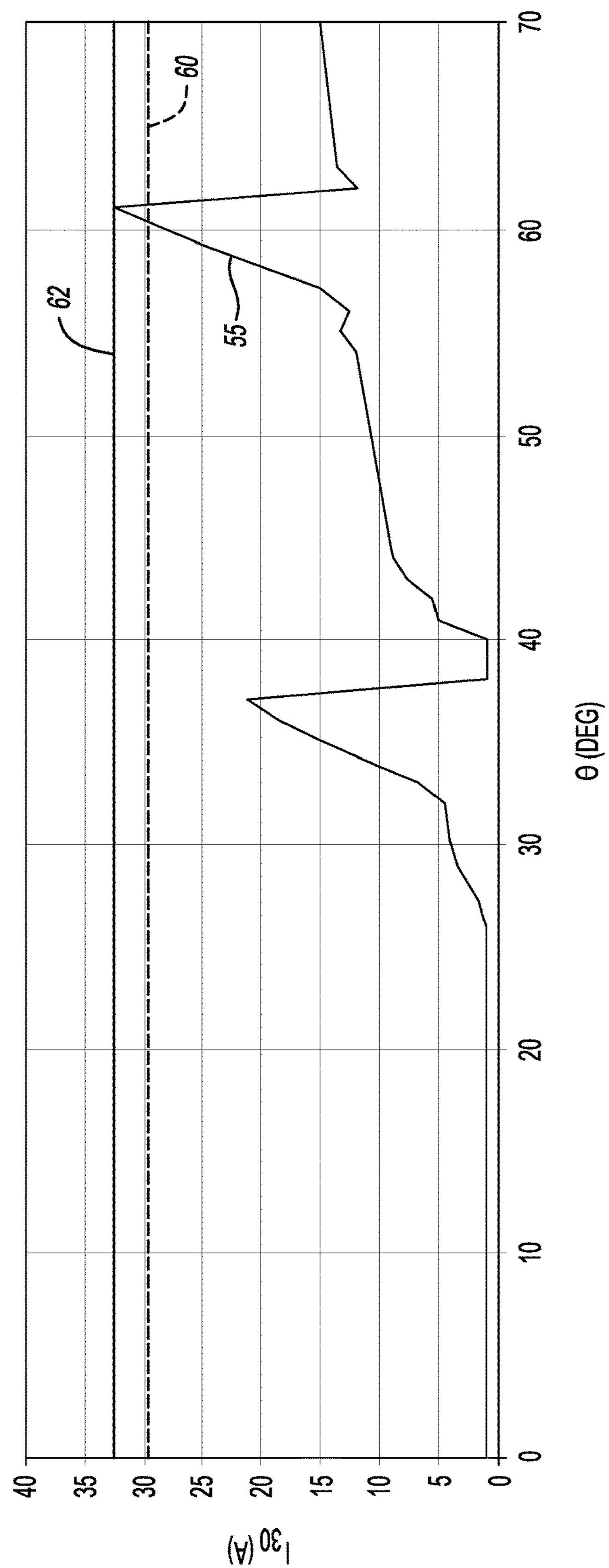
FIG. 3 is a plot describing an electrical current profile for a rotary actuator of the door, with current in amps depicted on the vertical axis and door swing angle in degrees depicted on the horizontal axis.

The present method 100, as will now be explained with further reference to FIGS. 2-4, provides a programmed approach that uses position sensing to automatically distinguish between dynamic effects on the front door 14F due to encountering a static obstacle in the path of the door 14F, in which case the controller 50 enforces the existing obstacle-based current threshold 60 of FIG. 3, and oscillating effects due instead to external forces, in particular those of high wind loads or grade. Using the proposed solution of the method 100, the controller 50 is able to closely monitor position changes of the front door 14F as a function of time. The controller 50 also determines an oscillation frequency of the door 14F using the position sensor $S_P$, determines or estimates the forces causing such oscillation, and ultimately adjusts the output torque of the rotary actuator 30 so as to compensate for the external forces.

Referring to FIGS. 2 and 3, the raw angular position signals 20 that are shown schematically in FIG. 1 are illustrated with respect to time (t) in FIG. 2 for baseline forward (F) and reverse (R) directions of travel of the door 14F, with the terms “forward” and “reverse” corresponding to arrows F and R in FIG. 1. FIG. 2 also depicts the response of the position sensor $S_P$ to oscillating motion (OSC) of the front door 14F due to wind or grade. As shown in FIG. 3, with actuator current ($I_{30}$) plotted on the vertical axis and angular position (θ) depicted on the horizontal axis, the controller 50 of FIG. 1 reads the oscillating response from the position sensor $S_P$ during a door closing or opening event, and responds by temporarily adjusting the obstacle-based current threshold 60 for the rotary actuator 30, in this instance upward to a level of an external force threshold 62. Additional thresholds could be used for a more fine-tuned response within the scope of the disclosure.

As a result of this control action, a commanded actuator current (trace 55) is allowed to temporarily exceed the default obstacle-based threshold 60, i.e., the threshold load on the rotary actuator 30 indicative of contact with a static obstacle, with the result being that the output torque of the rotary actuator 30 is allowed to increase by an amount sufficient for offsetting or compensating for the environmental contribution of the wind 15 of FIG. 1. A complementary approach may be used when oscillating motion (OSC) as detected using the raw angular position signals 20 from the position sensor $S_P$ is indicative of the wind 15 acting in the same or a complimentary direction as the motion of the front door 14F rather than resisting motion of the door 14F. In such a case, the controller 50 may respond by shorting the rotary actuator 30 to ground or reducing the actuator current to the rotary actuator 30 so as to brake or arrest motion of the door 14F.

In a manner that is similar to the programmed treatment of wind effects, the controller 50 may also detect road grade-based loads applied to the open door 14F, such as when closing the door 14F. The controller 50 is configured to determine additional gravitational component of the environmental contribution noted above, e.g., as a function of mass (m), angular position (0), and gravitational constant (g) as noted above, and in turn to calculate torque adjustments sufficient to compensate for the calculated gravitational component.

Analogous to the above-described wind condition in which the wind 15 provides the oscillation forces measured by the position sensor $S_P$, when handling grade consideration the controller 50 may actively induce oscillation of the side door 14F. One way to induce oscillation of the door 14F for the purposes of the method 100 is for the controller 50 to command a perturbation force pulse via the rotary actuator 30, and to thereafter use the position sensor $S_P$ to measure an oscillation frequency and offset from calibrated nominal values as shown in FIG. 2. The controller 50 may then relate the resultant decay of oscillation of the raw angular position signals 20 to grade-based forces acting on the front door 14F as the determined external force contribution. In this way, the controller 50 may determine the direction and general severity of the grade. Such an approach may be advantageous when accelerometers or other physical sensors capable of directly measuring the grade are not available. In response to determining grade, the controller 50 may access the lookup tables 25 of FIG. 1 and select a corresponding supplemental torque needed from the rotary actuator 30 to compensate for grade-based gravitational effects.

Referring to FIG. 4, the present approach may be summarized in terms of example logic steps or blocks embodying the method 100. At step S102, the controller 50 may ensure that a ground speed of the vehicle 10 is zero, i.e., the vehicle 10 is parked and not moving. Step S102, which may include processing output speed signals (not shown) from a transmission output speed sensor or a park, reverse, neutral, drive, low (PRNDL) lever setting in some embodiments, is repeated until the controller 50 determines that the vehicle 10 is not moving, and thereafter proceeds to step S104.

At step S104, the controller 50 measures the raw angular position of the front door 14F and approximates the amount of additional output torque or braking torque is needed from the rotary actuator 30. Part of step S104 may entail determining an amount of actuator current needed to achieve such torque, e.g., by accessing one of the lookup tables 25, and then proceeding to step S105.

Step S105 may include determining whether the front door 14F has encountered a static obstacle, such as by comparing the actuator current to the obstacle-based current threshold 60 of FIG. 2. The method 100 proceeds to step S106 when such an obstacle is not detected, and to step S116 in the alternative when conditions indicate that the door 14F has encountered a static obstacle.

Step S106 includes determining, using the raw angular position signals 20 from the position sensor $S_P$ of FIG. 1, whether oscillation of the front door 14F is present, with this condition treated as being indicative of the wind 15 acting on the door 14F. The method 100 proceeds to step S108 when oscillation is detected in the raw angular position signals 20. The method 100 proceeds to step S109 absent detection of such oscillation.

At step S108, the controller 50 uses the predetermined inertia of the front door 14F to calculate drag force due to the wind 15, and convert the additional drag force into a corresponding torque value sufficient to add to or cancel out the wind drag, depending on the direction of the door 14F with respect to the direction of the drag. Reference to the lookup tables 25 may be used for this purpose, or the value may be calculated or modeled/estimated in real time. The method 100 then proceeds to step S110.

Step S109 is arrived at from step S106 upon determining that the controller 50 does not detect wind-induced oscillation via the position sensor Sr. In this instance, the controller 50 injects a perturbation force pulse to the front door 14F via a calibrated pulse of electrical current to the rotary actuator 30, i.e., by temporarily exciting windings of the rotary actuator 30 so as to introduce a pulse force to the door 14F sufficient to start the door 14F moving in a desired direction. The controller 50 then allows the induced oscillation of the front door 14F to decay and proceeds to step S111.

Step S110 includes applying the calculated torque value from step S108. The controller 50 may transmit the actuator control signals (arrow $CC_{30}$) of FIG. 1 to the rotary actuator 30 to increase or decrease actuator current and thereby command the required additional torque or reduction in torque. The method 100 thereafter proceeds to step S114.

At step S111, the controller 50 measures the oscillation frequency and variation of the measured angular position of the front door 14F with respect to nominal positions as the oscillation decays. As part of step S111, the controller 50 compares the oscillation frequency and variation to calibrated values, such as by using prerecorded data in the lookup tables 25, to determine a corresponding slope and required torque. For example, the memory (M) of the controller 50 may be pre-programmed with lookup tables 25 containing data relating oscillation of the raw angular position signals 20 from the position sensor $S_P$ to external wind-based and gravity-based forces acting on the front door 14F, i.e., with different patterns of oscillation corresponding to different levels of wind or gravitational force, and by extension, the required motor output torque for compensating for such external or environmental forces. The method 100 thereafter proceeds to step S113.

Step S113 includes applying the calculated torque value from step S111. The controller 50 may transmit the actuator control signals (arrow $CC_{30}$) of FIG. 1 to the rotary actuator 30 to increase or decrease actuator current and thereby command the required additional torque or reduction in torque, and to thereby compensate for the gravitational contribution. The method 100 thereafter proceeds to step S114.

Step S114 may include monitoring the angular position of the front door 14F as the door 14F opens or closes, and calculating a torque error as a function of the difference between the applied torque and the resultant position. By comparing the torque error to a threshold, e.g., 10 percent, the controller 50 may be able to gradually adapt the values in the lookup tables 25 so as to fine-tune the performance of the rotary actuator 30 in executing the method 100.

Thus, by using the natural resonance of the door swing, and by monitoring the back drive of the rotary actuator 30 as explained above, the controller 50 is able to determine if resistance to motion of the door 14F is due to encountering an obstacle or due to high wind conditions or grade. The controller 50 can then default to the obstacle-based current threshold 60 of FIG. 3 when an obstacle is detected or may adjust the threshold up or down as needed in order to provide position-based torque compensation via the actuator 30 when door swing is affected instead by the wind 15 or grade.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; modifications, changes, and/or variations apparent from the foregoing descriptions are within the scope of the disclosure as defined in the appended claims. Moreover, the present concepts may expressly include combinations and sub-combinations of the preceding elements and features.

What is claimed is:

1. A system for controlling opening and closing of a power swinging door, the system comprising:

a rotary actuator configured to apply an output torque to the door in response to actuator control signals;

a position sensor configured to measure a raw angular position of the door and to output raw angular position signals indicative of the raw angular position; and a controller in communication with the rotary actuator and the position sensor, wherein the controller is programmed with a default obstacle-based current threshold limiting a flow of electrical current to the rotary actuator when the door encounters an obstacle while opening or closing, and is configured to use the raw angular position signals to detect oscillation of the raw angular position signals indicative of wind-based or grade-based external forces acting on the door when the door is opening or closing, and to selectively increase or decrease the obstacle-based current threshold in response to the oscillation to thereby selectively adjust the output torque from the rotary actuator and thereby compensate for the wind-based or grade-based external forces.

2. The system of claim 1, wherein the position sensor is a rotary encoder.

3. The system of claim 1, wherein the rotary actuator is an electric door motor.

4. The system of claim 1, wherein the controller is programmed with a set of lookup tables containing data relating the oscillation of the raw angular position signals to the external forces.

5. The system of claim 1, wherein the controller is programmed to induce a perturbation force pulse to the door via the actuator control signals to create an oscillation of the door, and to relate a resultant decay of the oscillation of the raw angular position signals to the external forces acting on the door.

6. The system of claim 1, wherein the controller is configured to selectively brake or arrest motion of the door via the rotary actuator, via adjustment of the flow of electrical current, in response to motion of the door in a direction that is the same as a direction of the external forces.

7. The system of claim 1, wherein the door is configured as a swinging side door of a motor vehicle and the controller is configured as a vehicle control module.

8. A vehicle comprising:

a vehicle body;

a swinging door that pivots about a hinge mounted to the vehicle body;

a rotary actuator configured to apply an output torque to the door in response to actuator control signals;

a position sensor configured to measure a raw angular position of the door, and outputs raw angular position signals indicative of the measured raw angular position; and a controller programmed to regulate an opening and closing motion of the door via the actuator control signals, wherein the controller is in communication with the rotary actuator and the position sensor, programmed with a default obstacle-based current threshold limiting a flow of electrical current to the rotary actuator when the door encounters an obstacle while opening or closing, and is configured to use an oscillation of the raw angular position signals to determine one or both of wind-based and grade-based external forces acting on the door when the door is opening or closing, and to selectively adjust the obstacle-based current threshold in response to the oscillation to thereby selectively adjust the output torque from the rotary actuator via the actuator control signals in response to the determined external forces.

9. The vehicle of claim 8, wherein the controller is configured to determine both of the wind-based and the grade-based external forces acting on the door.

10. The vehicle of claim 8, wherein the position sensor is a rotary encoder and the rotary actuator is an electric door motor.

11. The vehicle of claim 8, wherein the controller is programmed with a set of lookup tables containing data relating the oscillation of the raw angular position signals to the external forces acting on the door.

12. The vehicle of claim 8, wherein the controller is programmed to induce a perturbation force pulse via the actuator control signals to cause an oscillation of the door, and to relate a resultant oscillation decay of the raw angular position signals to the external forces.

13. The vehicle of claim 8, wherein the controller is programmed with a default obstacle-based current threshold limiting a flow of electrical current to the rotary actuator when the door encounters an obstacle while opening or closing, and to temporarily increase or decrease the default obstacle-based current threshold when the obstacle is not encountered.

14. The vehicle of claim 13, wherein the controller is further configured to selectively brake or arrest motion of the door using the rotary actuator via adjustment of the flow of electrical current in response to motion of the door in a direction that is the same as a direction of the external forces acting on the door.

15. A method for controlling opening and closing of a power swinging door, the method comprising:

measuring a raw angular position of the door via a position sensor;

outputting raw angular position signals indicative of the measured raw angular position;

determining, via a controller, wind-based or grade-based external forces acting on the door using oscillation of the raw angular position signals from the position sensor when the door is opening or closing; and selectively increasing or decreasing a default obstacle-based current threshold that limits a flow of electrical current to the rotary actuator when the door encounters an obstacle while opening or closing the door, including selectively adjusting the output torque from a rotary actuator via transmission of a set of actuator control signals from the controller to the rotary actuator in response to the determined external forces to thereby compensate for the external forces.

16. The method of claim 15, wherein measuring the raw angular position includes using a rotary encoder of an electric motor to output the raw angular position signals.

17. The method of claim 15, wherein determining the wind-based or grade-based external forces includes inducing oscillation of the door using the actuator control signals, including commanding a perturbation force pulse, and relating, via a lookup table of the controller, a resultant decay of the oscillation of the raw angular position signals to the external forces.

18. The method of claim 15, further comprising selectively braking or arresting motion of the door, via the rotary actuator, by adjusting the flow of electrical current to the rotary actuator in response to motion of the door in a direction that is the same as a direction of the external forces.

* * * * *